(12) United States Patent
Tung et al.

(10) Patent No.: US 12,386,397 B2
(45) Date of Patent: Aug. 12, 2025

(54) ELECTRONIC DEVICES WITH TOUCH SENSITIVE SURFACES AND USER INPUT DEVICES

(71) Applicant: Hewlett-Packard Development Company, L.P., Spring, TX (US)

(72) Inventors: Lo-Chun Tung, Taipei (TW); Chien-Pai Lai, Taipei (TW); Chung-Hua Ku, Taipei (TW); Yung-Chih Kuo, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 18/041,872

(22) PCT Filed: Oct. 19, 2020

(86) PCT No.: PCT/US2020/056320
§ 371 (c)(1),
(2) Date: Feb. 16, 2023

(87) PCT Pub. No.: WO2022/086489
PCT Pub. Date: Apr. 28, 2022

(65) Prior Publication Data
US 2023/0305600 A1    Sep. 28, 2023

(51) Int. Cl.
*G06F 1/16*  (2006.01)
(52) U.S. Cl.
CPC .......... *G06F 1/1667* (2013.01); *G06F 1/1616* (2013.01); *G06F 1/1643* (2013.01); *G06F 1/1681* (2013.01)

(58) Field of Classification Search
CPC .... G06F 1/1667; G06F 1/1616; G06F 1/1643; G06F 1/1681; G06F 1/1641; G06F 1/166; G06F 1/1662; G06F 1/1675; G06F 1/1677
See application file for complete search history.

(56) References Cited

U.S. PATENT DOCUMENTS

| | | | |
|---|---|---|---|
| 6,700,773 B1 * | 3/2004 | Adriaansen | G06F 1/1643 361/679.08 |
| 7,486,279 B2 | 2/2009 | Wong et al. | |
| 8,934,229 B2 | 1/2015 | Thorson | |
| 8,947,361 B2 | 2/2015 | Oakley | |
| 9,829,927 B2 * | 11/2017 | Kuscher | G06F 1/1662 |
| 10,678,300 B2 * | 6/2020 | Perelli | G06F 1/1618 |
| 10,754,390 B2 * | 8/2020 | Quinn | G06F 1/1669 |
| 11,036,254 B2 * | 6/2021 | Tzou | G06F 1/1616 |
| 11,573,611 B2 * | 2/2023 | Channaiah | E05D 11/105 |

(Continued)

FOREIGN PATENT DOCUMENTS

| | | |
|---|---|---|
| WO | 2010/028402 A1 | 3/2010 |
| WO | 2014/084818 A1 | 6/2014 |

*Primary Examiner* — Sagar Shrestha
(74) *Attorney, Agent, or Firm* — Quarles & Brady LLP

(57) ABSTRACT

Example electronic devices are disclosed herein. In an example, the electronic device includes a housing including a plurality of portions that are pivotably coupled together. The plurality of portions including a first portion including a display panel, a second portion including a user input device, and a third portion including a touch sensitive surface. The second portion is pivotably coupled between the first portion and the third portion. The third portion is pivotable relative to the second portion to cover the user input device with the touch sensitive surface.

15 Claims, 13 Drawing Sheets

(56) References Cited

U.S. PATENT DOCUMENTS

| | | | |
|---|---|---|---|
| 11,868,671 B2* | 1/2024 | Kwon | G06T 3/40 |
| 2002/0141146 A1* | 10/2002 | Mustoe | G06F 1/1649 |
| | | | 361/679.04 |
| 2003/0142469 A1* | 7/2003 | Ponx | G06F 1/1679 |
| | | | 361/679.04 |
| 2010/0064244 A1* | 3/2010 | Kilpatrick, II | H04M 1/0243 |
| | | | 345/1.3 |
| 2012/0162080 A1 | 6/2012 | Cao | |
| 2013/0120912 A1* | 5/2013 | Ladouceur | G06F 1/1616 |
| | | | 361/679.01 |
| 2014/0160654 A1* | 6/2014 | Yoo | G06F 1/1637 |
| | | | 361/679.12 |
| 2017/0277228 A1* | 9/2017 | Wong | G06F 1/1675 |
| 2018/0032203 A1 | 2/2018 | Sepulveda et al. | |
| 2019/0220061 A1* | 7/2019 | Fujimoto | G06F 1/16 |
| 2019/0320048 A1* | 10/2019 | Yang | G06F 1/1652 |
| 2020/0133336 A1 | 4/2020 | Wang | |
| 2020/0264826 A1* | 8/2020 | Kwon | G06F 1/1641 |
| 2020/0401263 A1* | 12/2020 | Chung | G06F 1/1647 |
| 2021/0096741 A1* | 4/2021 | Klein | G06F 1/1647 |
| 2021/0333840 A1* | 10/2021 | Channaiah | G06F 1/1679 |
| 2022/0206527 A1* | 6/2022 | Perelli | G06F 1/1626 |
| 2022/0382503 A1* | 12/2022 | Kwon | G06F 1/1681 |

* cited by examiner

ELECTRONIC DEVICES WITH TOUCH SENSITIVE SURFACES AND USER INPUT DEVICES

BACKGROUND

Electronic devices are utilized for a host of different functions and tasks, and may be able to receive multiple types of user inputs. For instance, an electronic device may receive user inputs in the form of typed text and/or free-hand markings (e.g., drawings, graphics, free-hand text, etc.) via suitable devices that are coupled to the electronic device.

BRIEF DESCRIPTION OF THE DRAWINGS

Various examples will be described below referring to the following figures.

DETAILED DESCRIPTION

An electronic device may receive user inputs in the form of typed text and/or free-hand markings via suitable devices during operations. Typed text in the form of alphanumeric characters may be input to an electronic device (e.g., for purposes of drafting a written message, code, etc.) via a keyboard (e.g., physical keyboard, digital keyboard, etc.). In addition, free-hand markings may be input to the electronic device via a touch sensitive surface (e.g., a graphics pad, touch-sensitive display, etc.).

In some instances, an electronic device may be mobile so that a user may transport the electronic device from place to place. Many electronic devices (e.g., such as laptop-style computers) include a coupled or even integrated keyboard. In addition, while a trackpad or touchpad may be included on an electronic device, adjacent a keyboard, these relatively small touch-sensitive surfaces are often insufficient for more extensive free-hand input by a user (e.g., drawings, handwritten text, etc.). Moreover, while a larger touch sensitive surface or panel may be communicatively coupled to the electronic device to provide enhanced free-hand input functionality, a user may not wish to transport multiple separate devices simultaneously.

Accordingly, examples disclosed herein include electronic devices comprising a user input device (e.g., such as a keyboard) and a touch sensitive surface pivotably coupled to the user input device. During operations, both the user input device and the touch sensitive surface may be selectively used to provide user inputs to the electronic device. In addition, because the touch sensitive surface and user input device are both pivotably coupled within the electronic device, the electronic device may be generally mobile so that a user may transport the electronic device (e.g., including the user input device and touch sensitive surface) from place to place.

Figure 1:
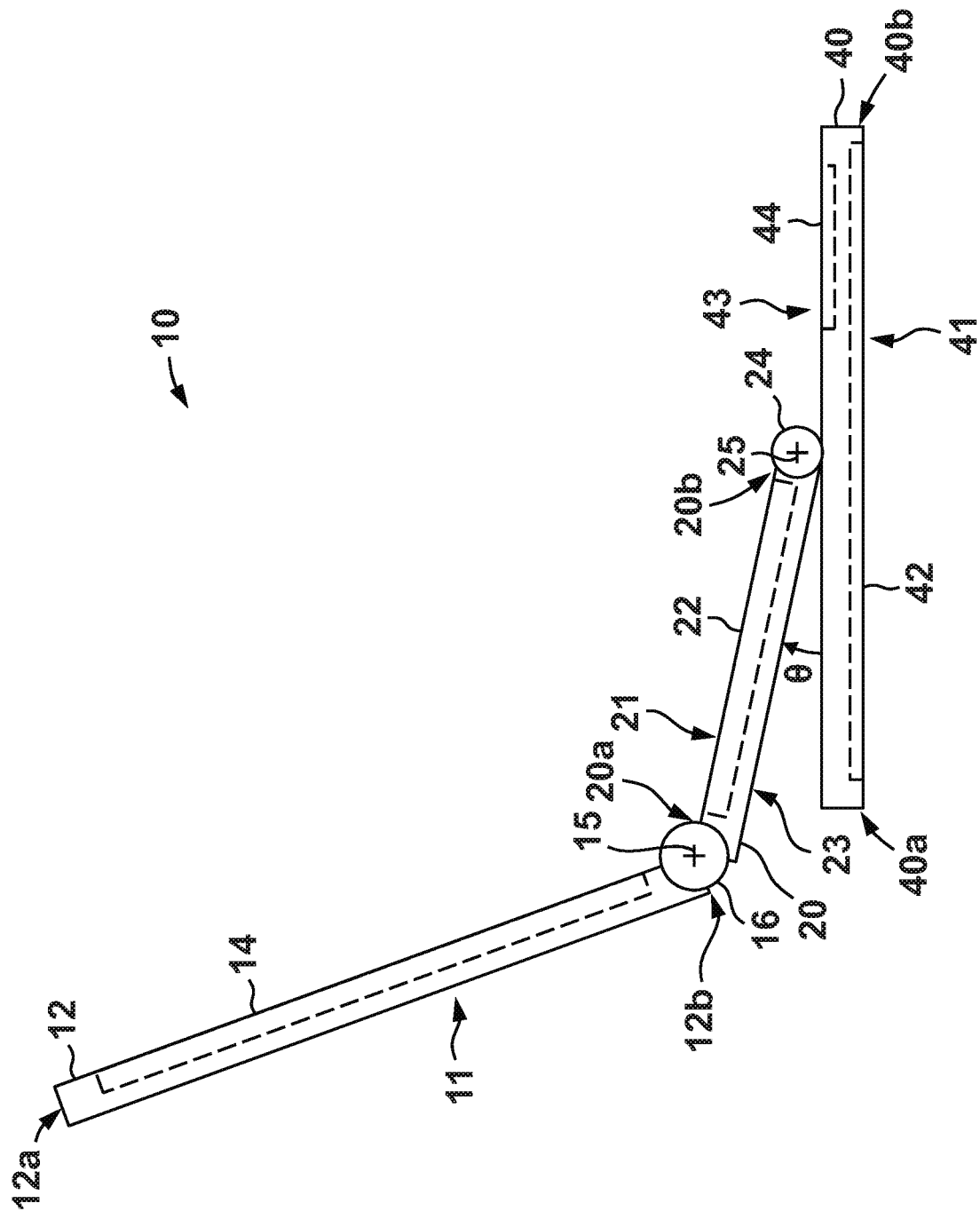
FIG. 1 is a side view of an electronic device including a user input device and a touch sensitive surface, with a portion of the housing of the electronic device in a first position according to some examples.

Referring now to FIG. 1, an electronic device 10 according to some examples disclosed herein is shown. As used herein, the term "electronic device" refers to a device or assembly that includes components such as processors (e.g., to execute machine-readable instructions), power supplies, memory, etc. For example, an electronic device may include a desktop computer, a smart phone, a tablet computer, a laptop computer, etc. In this example, electronic device 10 generally comprises a laptop-style computer that includes a housing 11 comprising a plurality of portions pivotably coupled together. Specifically, the housing 11 includes a first portion 12, a second portion 20, and a third portion 40. The second portion 20 is pivotably coupled to the first portion 12 via a first hinge 16, and the third portion 40 is pivotably coupled to the second portion 20 via a second hinge 24.

The first portion 12 includes a display panel 14. The display panel 14 may comprise any suitable type of electronic display (e.g., a liquid crystal display (LCD), organic light emitting diode (OLED) display, a plasma display, electrophoretic display, etc.). The first portion 12 also includes a first edge 12a and a second edge 12b opposite the first edge 12a.

The second portion 20 includes a first edge 20a and a second edge 20b opposite the first edge 20a. In addition, second portion 20 includes a first or upper side 21 and a second or lower side 23 opposite the upper side 21. Both the upper side 21 and the lower side 23 extend between the first edge 20a and the second edge 20b.

A user input device 22 is generally positioned on the upper side 21. The user input device 22 may comprise any suitable device or assembly that may be utilized by a user to provide text inputs to the electronic device 10 during operations. For instance, in some examples, the user input device 22 may comprise a keyboard, such as, for instance a physical keyboard with physically depressible keys or buttons that correspond with various commands, functions, alphanumeric characters, etc. In some instances, the keyboard of the user input device 22 may comprise a so-called "digital keyboard," which comprises an electronic display (e.g., such as any of the example electronic displays noted above for the display panel 14) that may display a number of keys or buttons thereon corresponding with various commands, functions, and/or alphanumeric characters as previously described. In some examples employing a digital keyboard as the user input device 22, the electronic display presenting the digital keys or buttons may comprise a touch sensitive surface (which is generally defined below) so as to allow the user engagement of the keys or buttons to be detected. Thus, as used herein, the term "keyboard," is intended to include both physical keyboards and digital keyboards.

During operations, a user may engage with or otherwise interact with the keys or buttons (e.g., physical buttons, digital buttons, etc.) of the user input device 22 so as to provide user inputs to the electronic device 10. In some instances, the user inputs received via the user input device 22 may comprise typed text, commands, etc. In some examples, the user inputs (or some of the user inputs) received via the user input device 22 may be displayed (e.g., directly, indirectly, etc.) via display panel 14.

Third portion 40 includes a first edge 40a and a second edge 40b opposite the first edge 40a. In addition, third portion 40 includes a first side 41 and a second side 43 that is opposite the first side 41. Both the first side 41 and the second side 43 extend between the first edge 40a and the second edge 40b. In some examples (e.g., such as in the example of FIG. 1), the third portion 40 may be generally larger than the second portion 20. For instance, the distance along (or parallel with) the sides 41, 43 between the edges 40a, 40b of third portion 40 is larger than the distance along (or parallel with) the sides 21, 23 between the edges 20a, 20b of second portion 20.

A first touch sensitive surface 42 is positioned on the first side 41 and a second touch sensitive surface 44 is positioned on the second side 43. As used herein, the phrase "touch sensitive surface" refers to a surface that may register or detect a touch event thereon. A touch event comprises the engagement of a finger, stylus, or other object with the touch sensitive surface. A touch sensitive surface may utilize a number of technologies or systems for sensing or detecting (including locating) a touch event thereon. For instance, according to various examples, a touch sensitive surface (e.g., such as the touch sensitive surfaces 42, 44) may comprise a resistive touch sensitive surface, a capacitive touch sensitive surface, surface acoustic wave touch sensitive surface, infrared touch sensitive surface, acoustic pulse touch sensitive surface, etc. Regardless of the touch sensing techniques utilized, during operations the electronic device 10 may receive touch inputs (e.g., touch events) via the first touch sensitive surface 42 and the second touch sensitive surface 44 (e.g., via a user's finger, a stylus, etc.). As with the user input device 22, user inputs received on the first touch sensitive surface 42 and the second touch sensitive surface 44 may be displayed (e.g., directly, indirectly, etc.) on the display panel 14.

In some examples, the first touch sensitive surface 42 may be larger than the second touch sensitive surface 44. For instance, in some examples the first touch sensitive surface 42 may comprise a graphics pad that a user may utilize to provide free-hand markings (e.g., drawings, free-hand text, graphics, etc.) as inputs to the electronic device 10. In some examples, the second touch sensitive surface 44 comprises a trackpad that may be used in conjunction with the user input device 22 (which may comprise a keyboard as previously described above). For instance, the second touch sensitive surface 44 may be engaged with a finger, stylus or other object so as to maneuver a cursor (e.g., arrow, finger, pointer, etc.) about a presented image provided on the display panel 14. However, in some examples, touch inputs on the first touch sensitive surface 42 may also be utilized to move a cursor about the presented image on the display panel 14, and/or the second touch sensitive surface 44 may be utilized to provide free-hand markings as inputs to the electronic device 10.

As previously described, the first portion 12 of housing 11 is pivotably coupled to second portion 20 via a first hinge 16, and the second portion 20 is pivotably coupled to third portion 40 via a second hinge 24. More particularly, in some examples the first hinge 16 is pivotably coupled to the second edge 12b of the first portion 12 and the first edge 20a of the second portion 20. In addition, in some examples the second hinge 24 is pivotably coupled to the second edge 20b of the second portion 20 and the second side 43 of the third portion 40 such that the second hinge 24 is spaced between the first edge 40a and the second edge 40b. The second hinge 24 may be coupled to the second side 43 such that the second hinge 24 is positioned between the first edge 40a and the second touch sensitive surface 44. As a result, the second touch sensitive surface 44 may be positioned between the second hinge 24 and the second edge 40b.

The first hinge 16 includes a first axis of rotation 15, and the second hinge 24 includes a second axis of rotation 25. As a result, the first portion 12 and the second portion 20 may pivot relative to one another about the first axis of rotation 15 via the first hinge 16, and the second portion 20 and the third portion 40 may pivot relative to one another about the second axis of rotation 25 via the second hinge 24. In some examples, the first axis of rotation 15 is parallel to the second axis of rotation 25. In addition, the first axis of rotation 15 and the second axis of rotation 25 may also be parallel to (and in some cases aligned with) the edges 20a, 20b, 40a, 40b.

The first hinge 16 and the second hinge 24 may comprise any suitable pivotable coupling mechanism. For instance, in some examples, the first hinge 16 and/or the second hinge 24 comprise pinned couplings. In some examples, the first hinge 16 and/or the second hinge 24 may comprise a so-called "living hinge," that includes a flexible or compliant material (e.g., an elastomer, a fabric, etc.) that may elastically deform so as to allow pivotable motion thereabout (e.g., such as pivotable motion between the first portion 12 and second portion 20 and/or pivotable motion between the second portion 20 and third portion 40).

Figure 2:
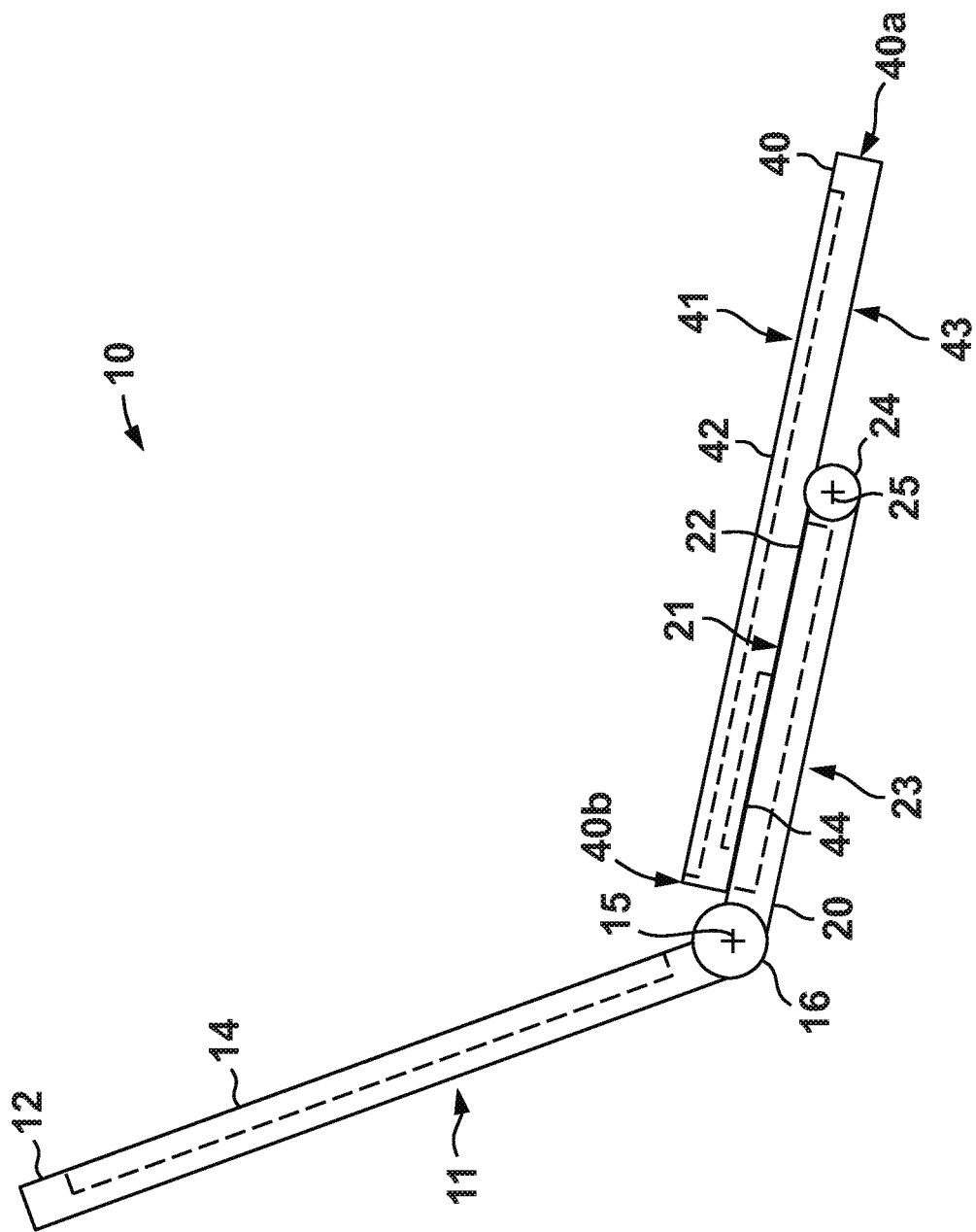
FIG. 2 is a side view of the electronic device of FIG. 1, showing the portion of the housing in a second position according to some examples.

Referring now to FIGS. 1 and 2, the third portion 40 may be pivoted about the second hinge 24 (and thus about the second axis of rotation 25) relative to the second portion 20 between a plurality of positions. For instance, the third portion 40 may be pivoted about the second hinge 24 relative to the second portion 20 to a first position shown in FIG. 1 and a second position shown in FIG. 2. In the first position (FIG. 1) the third portion 40 is pivoted about the second hinge 24 so that the second touch sensitive surface 44 is adjacent the user input device 22, and the user input device 22 is positioned over the first touch sensitive surface 42. In the second position (FIG. 2), the third portion 40 is pivoted about the second hinge 24 so that the first touch sensitive surface 42 covers (or extends over) the user input device 22.

More specifically, referring specifically to FIG. 1, when the third portion 40 is in the first position, a portion of the second side 43 (e.g., the portion extending from the second hinge 24 to the second edge 40b that includes the second touch sensitive surface 44) may be adjacent to the second edge 20b of second portion 20 and user input device 22. Accordingly, when the third portion 40 is in the first position, the second touch sensitive surface 44 is adjacent the user input device 22 on second portion 20, such that when the electronic device 10 is in the first position of FIG. 1, a user may provide inputs to the electronic device 10 via the user input device 22 and the second touch sensitive surface 44. In addition, when in the first position, the first touch sensitive surface 42 may be deactivated (e.g., via a processor 82 as described in more detail below). Further, when in the first position, the first side 41 of third portion 40 (which includes the first touch sensitive surface 42 as previously described) may comprise a lower-most surface of the electronic device 10. Thus, in the first position, the first side 41 may engage with a support surface (e.g., a desk, table, countertop, user's lap, floor, etc.). In some examples, the first side 41 may comprise feet or other projections for engaging with the support surface (not shown) when in the first position of FIG. 1.

Referring specifically now to FIG. 2, when the third portion 40 of the electronic device 10 is in the second position, the third portion 40 may be pivoted about the second hinge 24 so that the first side 41 of the third portion 40 generally covers the second portion 20. Specifically, when in the second position, the first touch sensitive surface 42 may cover the user input device 22 so that the user input device 22 is occluded from the user's view point. In addition, when the third portion 40 is in the second position, the second side 43 of third portion 40 may generally abut or engage with (or may simply oppose without actual engagement) the upper side 21 of second portion 20. Further, when the third portion 40 is in the second position, the lower side 23 of the second portion 20 and the second side 43 of the third portion 40 (e.g., the portion of the second side 43 that extends between the second hinge 24 and the first side 41) may engage with a support surface. When the third portion 40 is in the second position, a user may provide inputs to the electronic device 10 via the first touch sensitive surface 42, and the second touch sensitive surface 44 and user input device 22 may be deactivated (e.g., via a processor 82 as described in more detail below).

Figure 3:
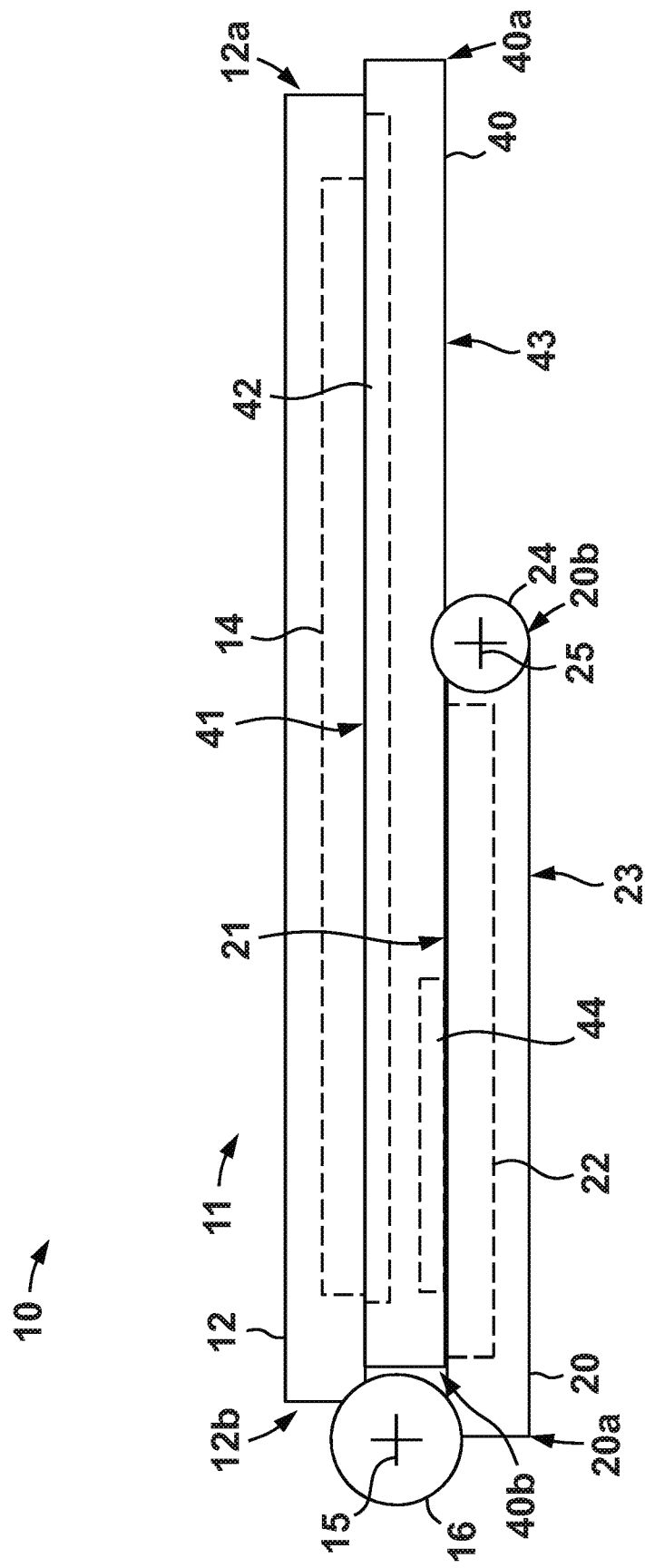
FIG. 3 is a side view of the electronic device of FIG. 1 showing the housing in a closed position according to some examples.

Referring now to FIG. 3, when the third portion 40 of the housing 11 is in the second position (FIG. 2), the first portion 12 may be pivoted relative to the second portion 20 about the first hinge 16 (and thus also about the first axis of rotation 15) so as to engage the first portion 12 with the first side 41 of the third portion 40. In some examples, when the first portion 12 is pivoted about the first hinge 16, the first portion 12 may oppose the first side 41 of the third portion 40 without actually engaging therewith. In this position, the electronic device 10 may be more easily transported from one place to another. As a result, the position of the housing 11 in FIG. 3 may be referred to as a closed or folded position.

Figure 4:
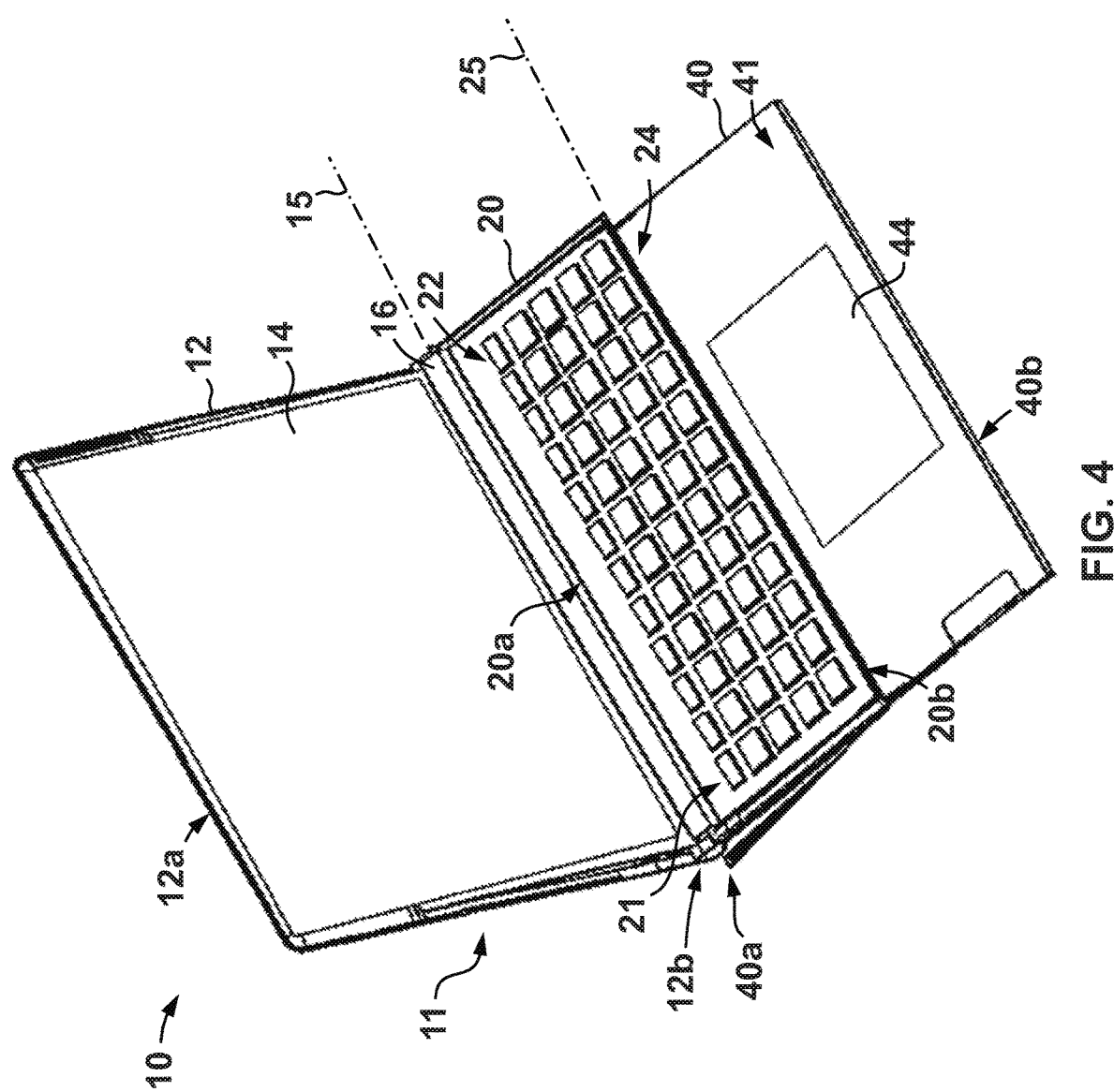
FIG. 4 is a front perspective view of an electronic device including a user input device and a touch sensitive surface, with a portion of the housing of the electronic device in the first position according to some examples.
Figure 5:
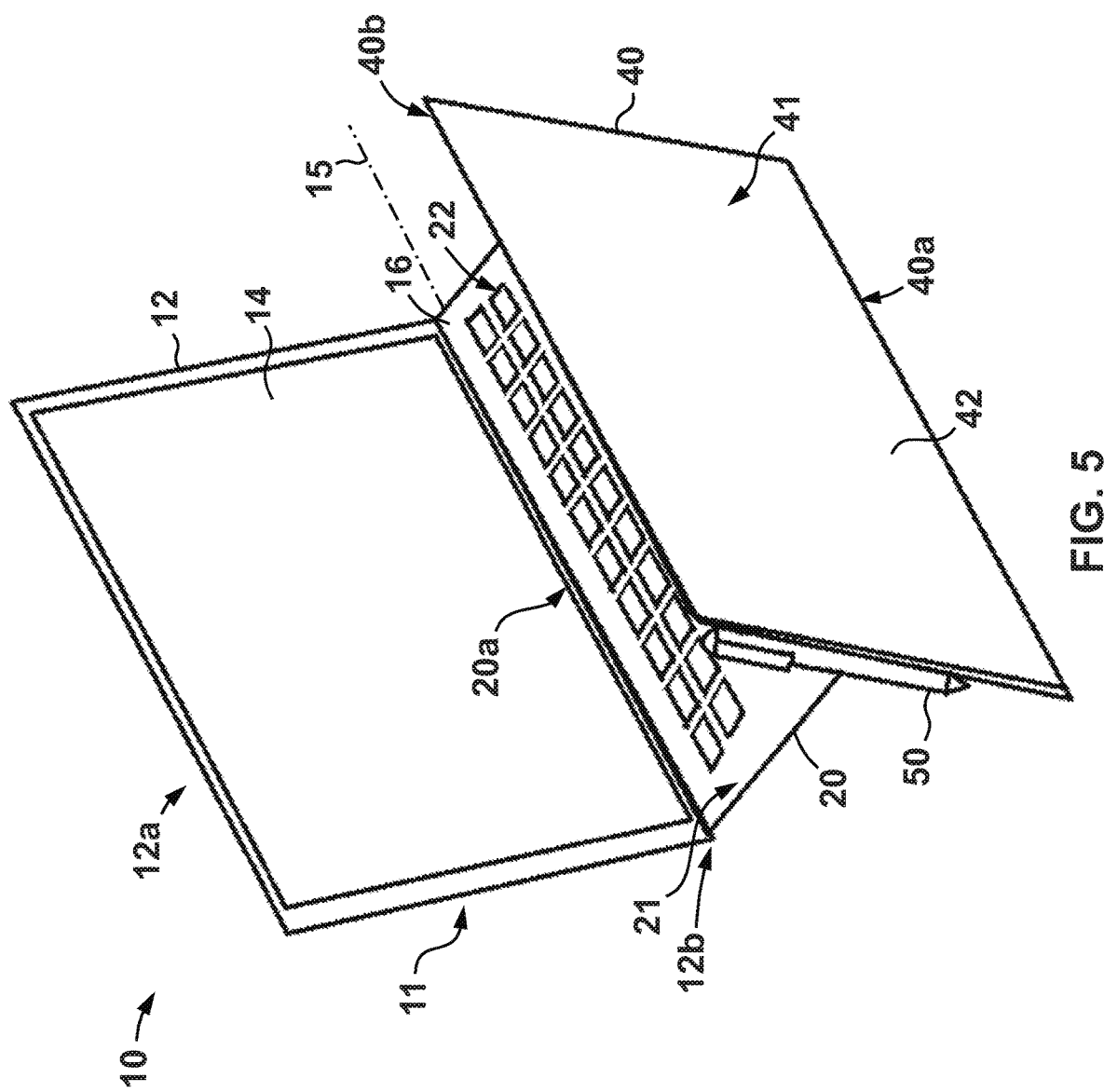
FIG. 5 is a front perspective view of the electronic device of FIG. 4 showing the portion of the housing in transition between the first position and a second position according to some examples.
Figure 6:
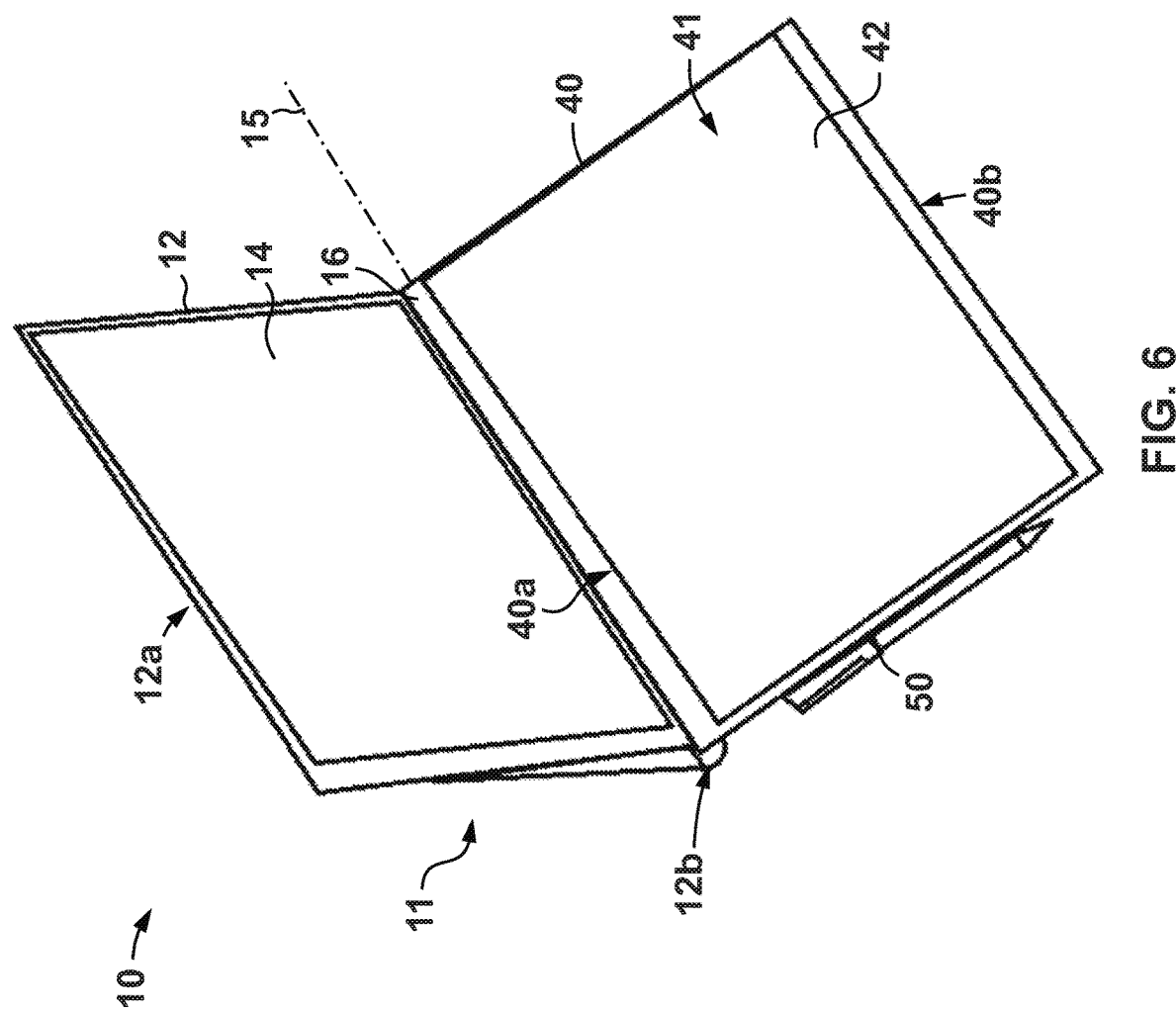
FIG. 6 is a front perspective view of the electronic device of FIG. 4 showing the portion of the housing in the second position according to some examples.

Referring now to FIGS. 4-6, perspective views of an example implementation of electronic device 10 are shown. In particular, FIG. 4 shows the electronic device 10 with the third portion 40 in the first position (see e.g., FIG. 1), FIG. 6 shows the electronic device 10 with the third portion 40 in the second position (see e.g., FIG. 2), and FIG. 5 shows third portion 40 in transition between the first position (see e.g., FIG. 1) and the second position (see e.g., FIG. 2). In the views of FIGS. 4-6, the components and features of the electronic device 10 that were previously described above and shown in FIGS. 1-3 are labeled with the same reference numerals.

From the views in FIGS. 4-6, one can appreciate that when the third portion 40 is in the first position of FIGS. 1 and 4, the second touch sensitive surface 44 is adjacent to the user input device 22 (which in the example of FIG. 4 is a physical keyboard as previously described), so that a user may provide inputs to the electronic device 10 via both the user input device 22 (e.g., via typing), and the second touch sensitive surface 44 (e.g., via engagement of the second touch sensitive surface 44 with a finger, stylus, etc.). In addition, from the views of FIGS. 4-6, one can also appreciate that when the third portion 40 is in the second position of FIGS. 2 and 6, the first touch sensitive surface 42 on first side 41 of third portion 40 covers or occludes the user input device 22.

In addition, referring specifically to FIGS. 5 and 6, in some examples, a stylus 50 may be coupled to the housing 11 of electronic device 10. For instance, in the example of FIGS. 5 and 6, the stylus 50 is coupled to a side or other surface of the third portion 40, so that a user may retrieve the stylus 50 to provide inputs therewith on the first touch sensitive surface 42 when the third portion 40 is in the second position of FIGS. 2 and 6. Any suitable mechanism may be utilized to secure the stylus 50 to the housing 11 (e.g., such as a side or surface of the third portion 40 as previously described), such as, for instance, magnets, hook and loop connectors, a recess extending within housing 11 (or along a surface thereof) that may receive some or all of the stylus 50 therein, etc.

Figure 7:
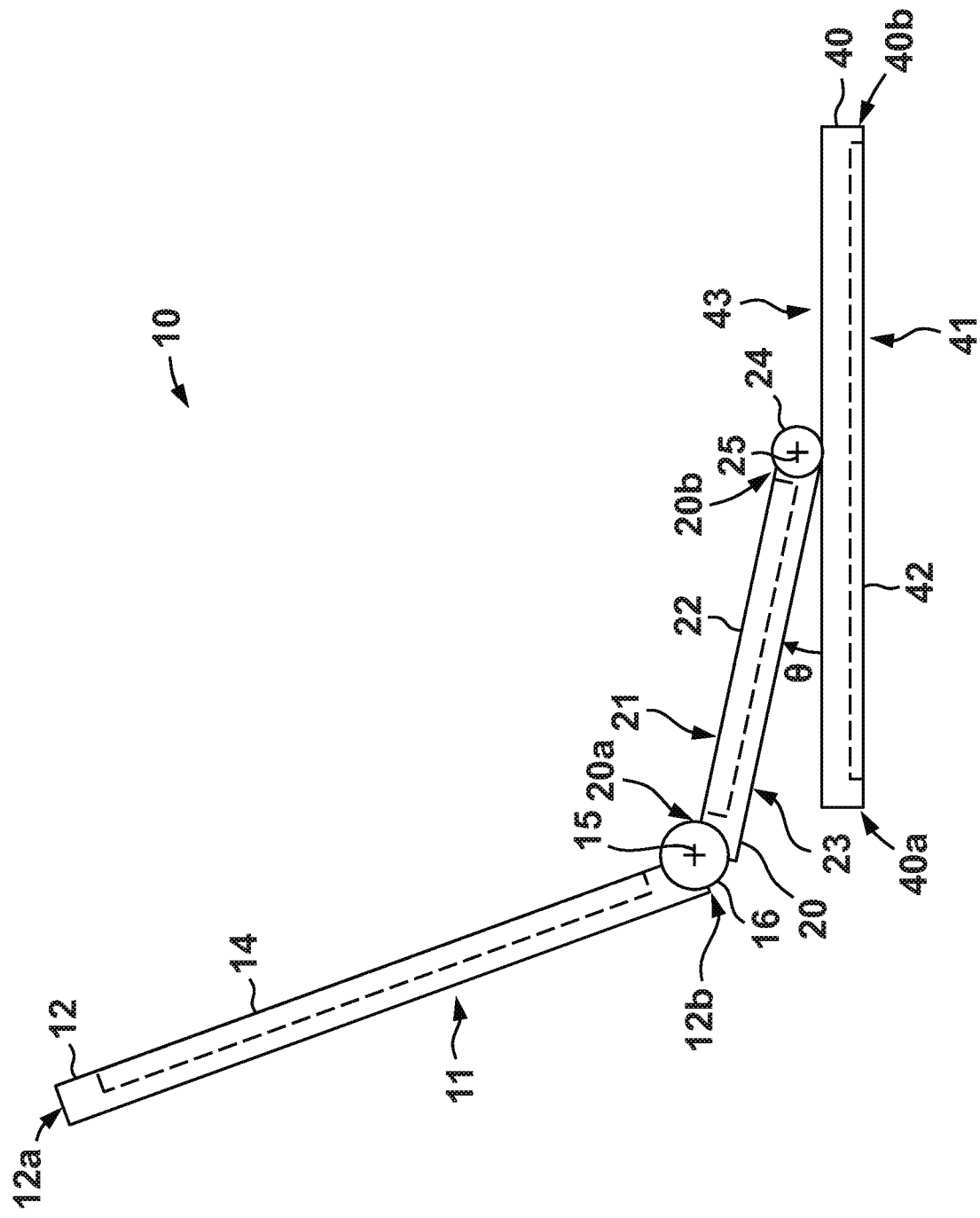
FIG. 7 is a side view of an electronic device including a user input device and a touch sensitive surface, with a portion of the housing of the electronic device in a first position according to some examples.

Referring now to FIG. 7, in some examples, the second touch sensitive surface 44 (see e.g., FIG. 1) may be omitted from the second side 43 of third portion 40. Specifically, in some examples, the second touch sensitive surface 44 may be omitted entirely from electronic device 10 or may be included in another location within housing 11 (e.g., such as on the upper side 21 of second portion 20 alongside or integral within the user input device 22).

Referring again to FIG. 1, when the third portion 40 is in the first position, the second portion 20 may extend at a non-zero angle θ to the third portion 40. In some examples, the angle θ may range from about 1° to about 10°; however, other non-zero values of the angle θ are contemplated for other examples. When placed in this position, the user input device 22 may be angled so as to promote an ergonomic interaction with the user's hands when the user is typing or otherwise providing inputs on the user input device 22 (which may comprise a keyboard as previously described). In addition, when the third portion 40 is placed in the first position of FIG. 1 and a user is typing or engaging with the user input device 22, the user's palms may rest on the second side 43 of the third portion 40 (e.g., on the portion of the second side 43 extending from the second hinge 24 to the second edge 40b, and on either side of the second touch sensitive surface 44—see e.g., FIG. 4).

The angle θ may be achieved between the second portion 20 and the third portion 40 by any suitable mechanism. For instance, in some examples, the second hinge 24 may include a stopper (or stoppers) that limit rotation of the third portion 40 about the second hinge 24. In some examples, the lower side 23 of second portion 20 and/or the second edge 12b of first portion 12 may include feet, offsets, and/or other structures that engage with the second side 43 of third portion 40 (e.g., in the region between the second hinge 24 and the first edge 40a) and thereby place the second portion 20 at the angle θ relative to third portion 40.

Figure 8:
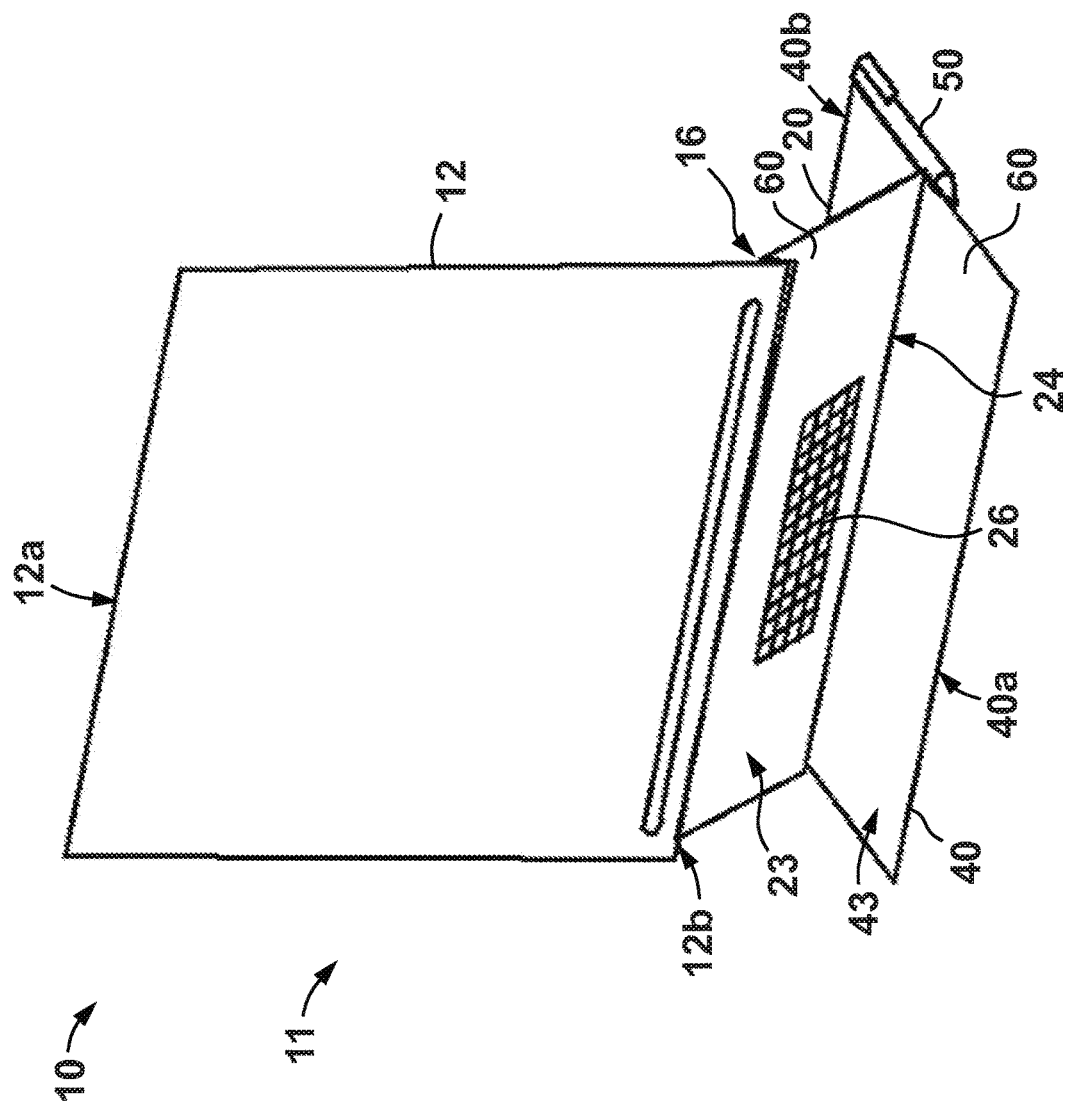
FIG. 8 is a rear perspective view of an electronic device including a user input device and a touch sensitive surface according to some examples.

Referring now to FIG. 8, in some examples, the second hinge 24 may comprise a living hinge as previously described that may limit rotation of the third portion 40 thereabout so as to achieve the angle θ for the second portion 20. For instance, in the example of FIG. 8, a compliant material 60 is engaged along the lower side 23 of second portion 20 and along a portion of the second side 43 of third portion 40 extending from first edge 40*a*. The portion of the compliant material 60 that extends between the second edge 20*b* of second portion 20 to the second side 43 of third portion 40 may form (e.g., partially or wholly) the second hinge 24. As a result, rotation of the third portion 40 about the second hinge 24 may comprise bending the compliant material 60 along the portion that extends from second edge 20*b* of second portion 20 to second side 43 of third portion 40. The compliant material 60 may have a minimum radius of curvature that may be achieved via the above-described bending, and this minimum radius of curvature may result in the angle θ for the second portion 20 relative to the third portion 40 as previously described. In some examples, the compliant material 60 may also extend over a portion of the first portion 12 (e.g., such as on the side opposite the display panel 14—see e.g., FIG. 1). In some examples, the compliant material 60 may comprise a fabric (e.g., such as leather).

In some examples, the lower side 23 of the second portion 20 may include a vent 26 that may allow for airflow into and/or out of the second portion 20 during operations. Without being limited to this or any other theory, the airflow into and/or out of the vent 26 may transfer heat away from electronic components positioned within the second portion 20 (e.g., processors, memories, etc.). Thus, when the third portion 40 is placed in the first position (see e.g., FIG. 1), the angle θ between the second portion 20 and the third portion 40 may lift the vent 26 away from the third portion 40 (specifically the second side 43) so as to promote airflow into and/or out of the vent 26 during operations.

Figure 9:
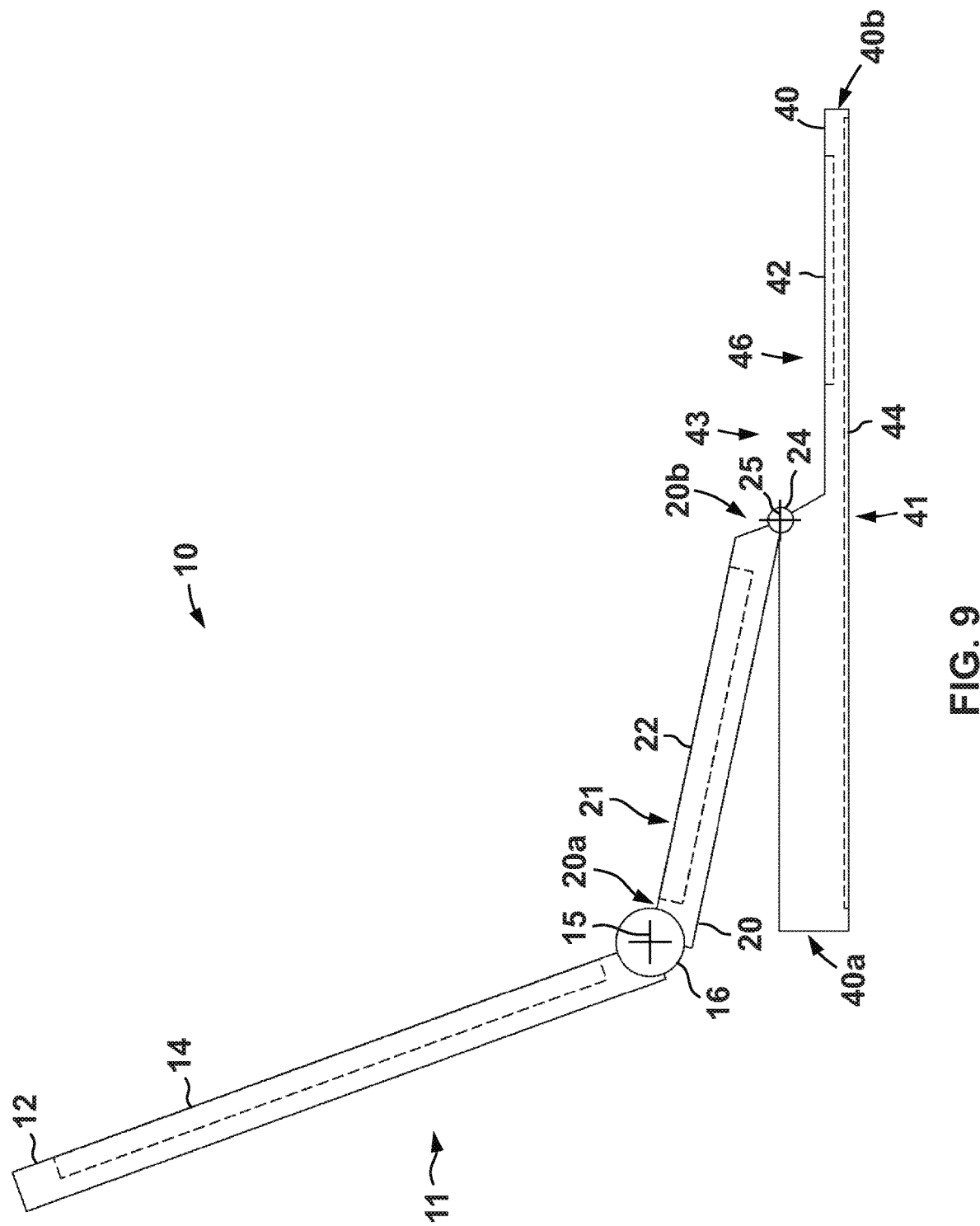
FIG. 9 is a side view of an electronic device including a user input device and a touch sensitive surface, with a portion of the housing of the electronic device in a first position according to some examples.
Figure 10:
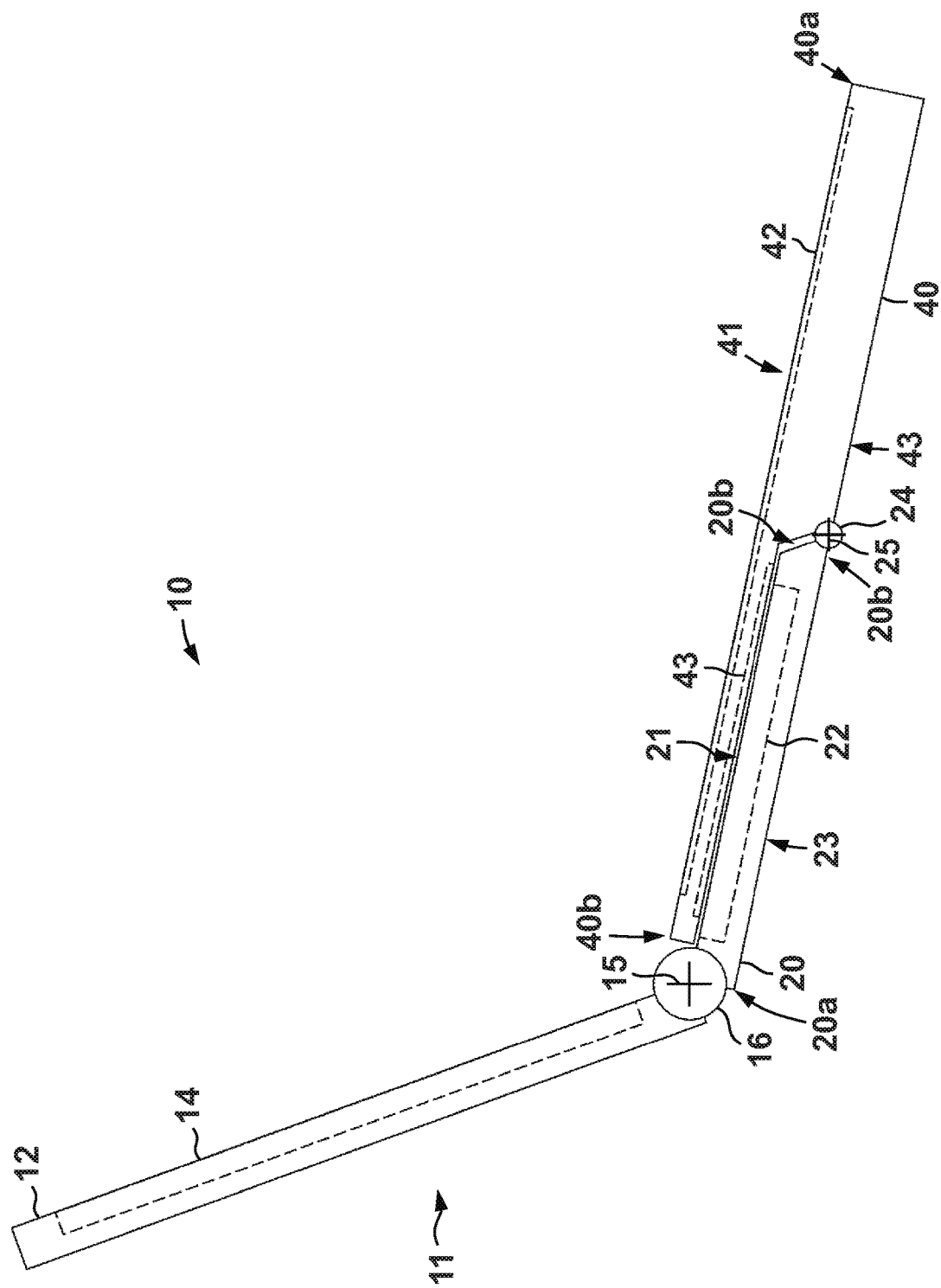
FIG. 10 is a side view of the electronic device of FIG. 10, showing the portion of the housing in a second position according to some examples.

Referring now to FIGS. 9 and 10, in some examples, the second side 43 of the third portion 40 may include a recess 46 extending from the second edge 40*b* to the second hinge 24. As a result, when the third portion 40 is pivoted from the first position of FIG. 9 (see also FIG. 1) to the second position of FIG. 10 (see also, FIG. 2), the second portion 20 may be received within the recess 46. In some examples (e.g., such as in the example of FIGS. 9 and 10), when the third portion 40 is in the second position of (FIG. 10), the lower side 23 of the second portion 20 and the portion of the second side 43 of third portion 40 extending from the hinge 24 to the first edge 40*a* may be co-planar with one another.

Figure 11:
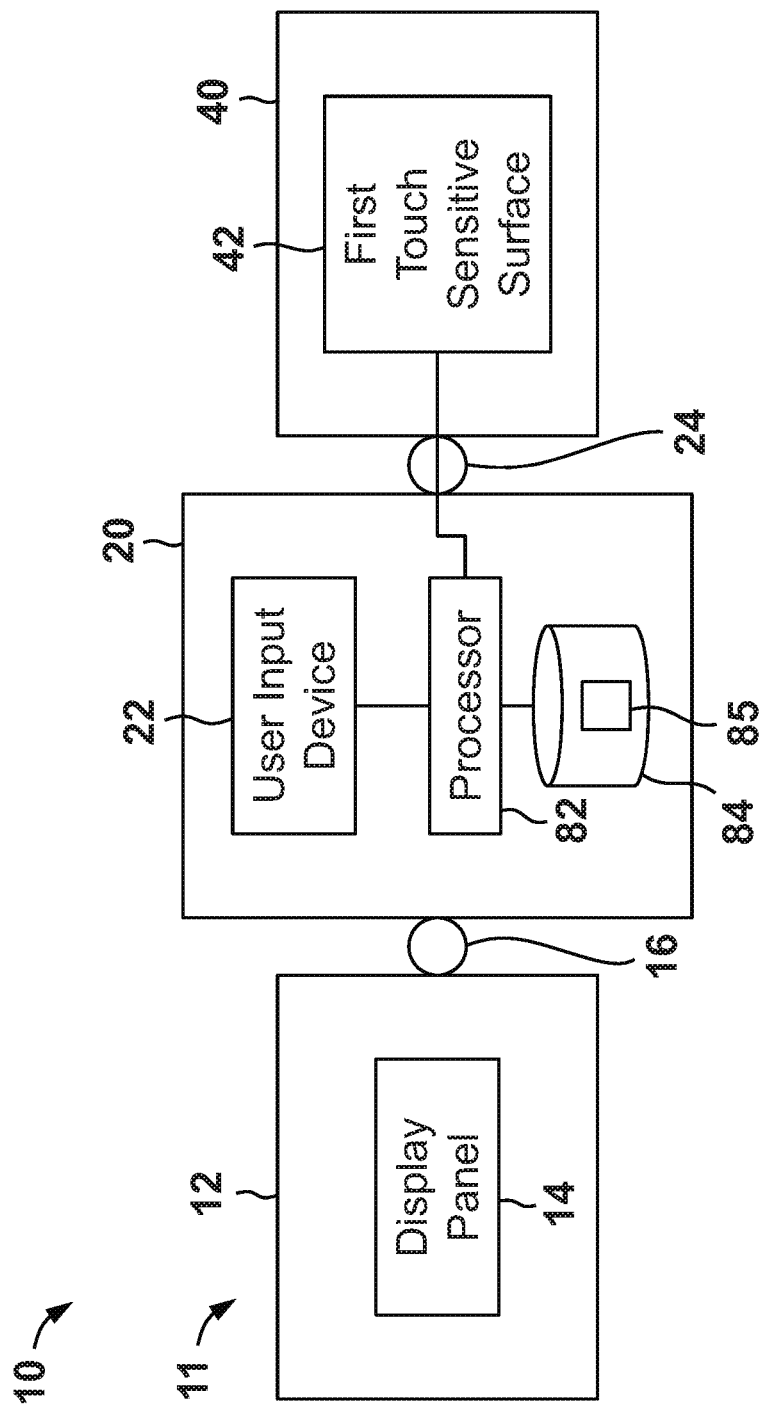
FIG. 11 is a block diagram of an electronic device including a user input device and a touch sensitive surface according to some examples.

Referring now to FIG. 11, in some examples a processor 82 may be positioned within housing 11 and communicatively coupled to the user input device 22 and the first touch sensitive surface 42 of the third portion 40. In FIG. 11, processor 82 is depicted as being positioned within the second portion 20 of housing 11. However, processor 82 may be positioned within first portion 12, second portion 20, or third portion 40 in various examples.

In some examples, processor 82 may comprise a microprocessor, a central processing unit (CPU), a processor within a microcontroller, etc. Processor 82 may execute machine-readable instructions 85 that are stored on a memory 84 (e.g., a non-transitory machine-readable medium), thereby causing the processor 82 to perform some or all of the actions attributed herein to the processor 82 (and, more generally, to the electronic device 10).

In some examples, the memory 84 may be positioned within the second portion 20 (e.g., such as is shown in FIG. 11). However, in some examples, the memory 84 may be positioned within the first portion 20 or the third portion 40, or may be distributed among the first portion 12, second portion 20, and the third portion 40 (or a subset of the first portion 12, second portion 20, and the third portion 40). The memory 84 may comprise volatile storage (e.g., random access memory (RAM)), non-volatile storage (e.g., flash storage, etc.), or combinations of both volatile and non-volatile storage. Data read or written by the processor 82 when executing the machine-readable instructions 85 can also be stored on memory 84.

As previously described, during operations the processor 82 is to activate one of the user input device 22 or the first touch sensitive surface 42 and deactivate the other of the user input device 22 or the first touch sensitive surface 42 based on a rotational position of the first touch sensitive surface 42 relative to the user input device 22. In particular, when the third portion 40 is rotated relative to second portion 20 about the second hinge 24 to the first position shown in FIG. 1, the first touch sensitive surface 42 may be the lower-most surface of the electronic device 10 that may engage (or oppose) a support surface. As a result, in some examples, when the third portion 40 is in the first position of FIG. 1, the processor 82 may deactivate the first touch sensitive surface 42 so that touch events on the first touch sensitive surface 42 are prevented from being received as inputs on the electronic device 10. In addition, as is also previously described, when the third portion 40 is placed in the first position of FIG. 1, the user input device 22 may be available for use by the user on the second portion 20. As a result, in some examples, when the third portion 40 is in the first position of FIG. 1, the processor 82 may additionally activate the user input device 22 so that the user may provide inputs to the electronic device 10 with the user input device 22.

Figure 12:
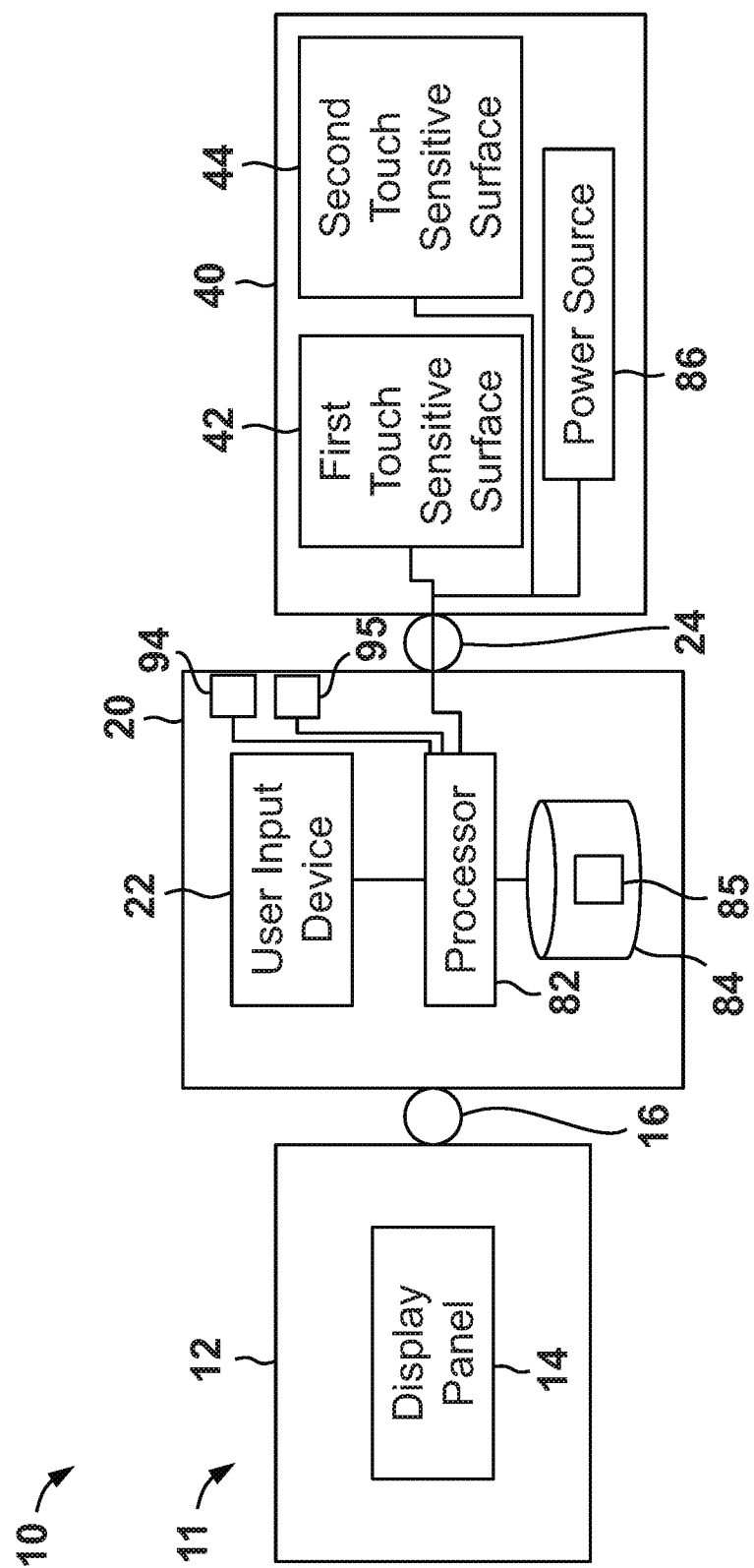
FIG. 12 is a block diagram of an electronic device including a user input device and a touch sensitive surface according to some examples.

Referring now to FIG. 12, in some examples, the processor 82 may also be coupled to the second touch sensitive surface 44. Thus, when the third portion 40 is placed in the first position of FIG. 1, the processor 82 may also activate the second touch sensitive surface 44 so that a user may provide inputs to the electronic device 10 using the second touch sensitive surface 44 and the user input device 22.

Referring again to FIG. 11, when the third portion 40 is rotated relative to the second portion 20 about the second hinge 24 to the second position shown in FIG. 2, the first touch sensitive surface 42 may cover the user input device 22 as previously described. As a result, in some examples, when the third portion 40 is in the second position of FIG. 2, the processor 82 may activate the first touch sensitive surface 42 to receive user inputs for the electronic device 10. In addition, when the third portion 40 is in the second position of FIG. 2, the processor 82 may deactivate the user input device 22 on the second portion 20. Moreover, in some examples (e.g., such as in the example of FIG. 12), the processor 82 may also deactivate the second touch sensitive surface 44 when the third portion 40 is in the second position of FIG. 2.

The processor 82 may determine when the third portion 40 is in the first position of FIG. 1 or the second position of FIG. 2 in a variety of methods or manners. In some examples, the second hinge 24 may include a bend sensor or other suitable device or assembly for detecting a relative positions of the third portion 40 and second portion 20 about the second hinge 24 during operations.

In some examples, the second portion 20 and/or the third portion 40 may include magnets that may be utilized for determining a relative, rotative position of the third portion 40 about the second hinge 24. For instance, referring now to FIG. 13, in some examples the second portion 20 and third portion 40 may include magnets 90 and 91, respectively, that may come within sufficient proximity to one another when the third portion 40 is in the first position (see e.g., FIG. 1) so as to attract one another and therefore maintain the third portion 40 in the first position. In some examples, the magnet 90 in second portion 20 and/or the magnet 91 in the third portion 40 may be disposed within or on a projection or other suitably shaped surface so that when the third portion 40 is in the first position, the magnets 90, 91 (or surfaces of the portions 20, 40 immediately adjacent the magnets 90, 91) are brought into contact with one another. In some examples, the magnet 90 in the second portion 20 may be included within the first portion 12 (e.g., such as at or near the second edge 12b of first portion 12), or within the first hinge 16.

Figure 14:
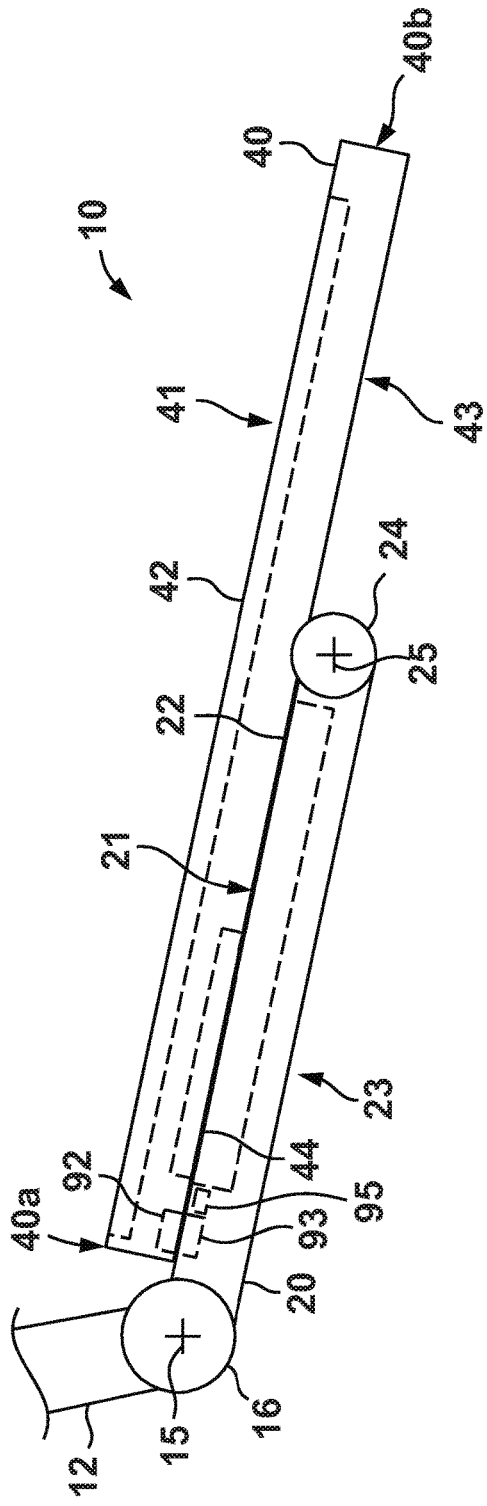

Referring now to FIG. 14, in some examples, the second portion 20 and the third portion 40 may include magnets 93 and 92, respectively, that may come within sufficient proximity to one another when the third portion 40 is in the second position (see e.g., FIG. 2) so as to attract one another and therefore maintain the third portion 40 in the second position. The magnets 90, 91, 92, 93 may comprise permanent magnets or electromagnets.

Figure 13:
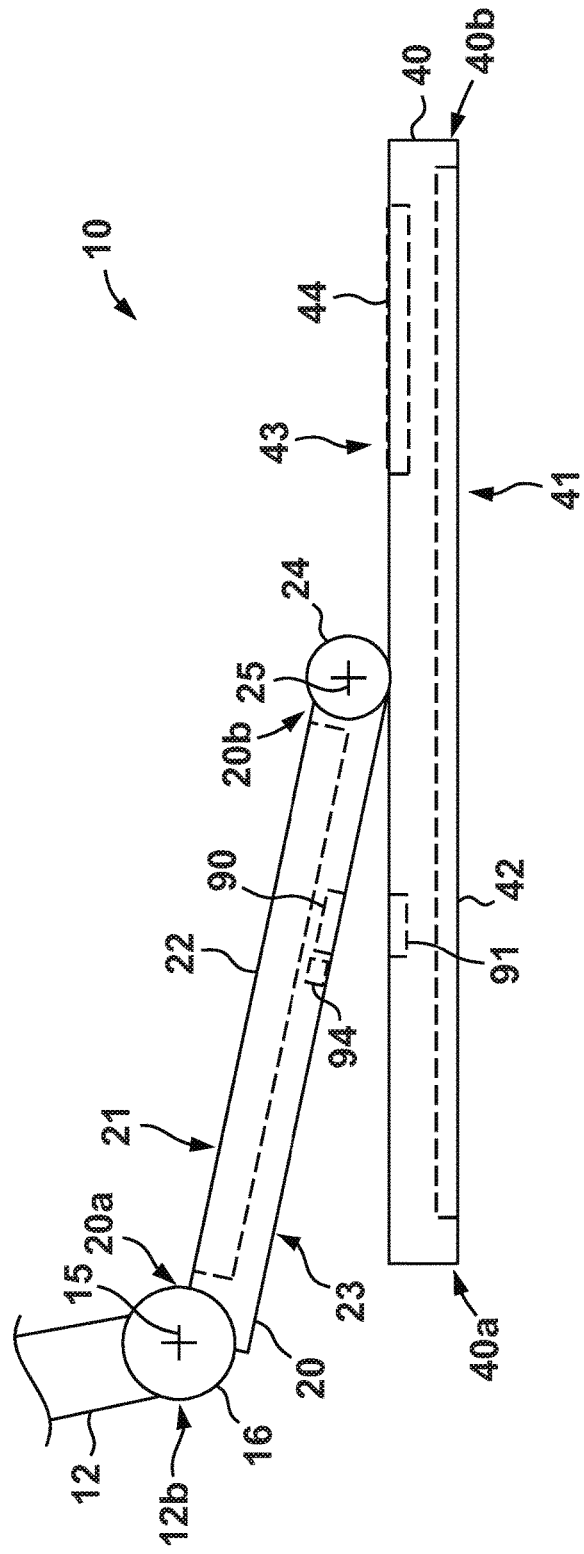
FIGS. 13 and 14 are enlarged side views of electronic devices including a user input device and a touch sensitive surface according to some examples.

Referring now to FIGS. 12-14, in some examples the second portion 20, and/or the third portion 40 may include a suitable sensor (or sensors) (e.g., hall effect sensor) that is (or are) to sense or detect a magnetic field (e.g., such as would be associated with the magnets 90, 91, 92, 93). For instance, in some examples, the second portion 20 may include a sensor 94 that is to detect a magnetic field associated with the magnet 91 coupled to the third portion 40. Thus, during operations, when the third portion 40 is placed in the first position of FIGS. 1 and 12, the sensor 94 may detect the magnetic field associated with magnet 91 and based on the output from the sensor 94 the processor 82 (see e.g., FIG. 12) may determine that the third portion 40 is in the first position and therefore activate the user input device 22 and/or second touch sensitive surface 44 and deactivate the first touch sensitive surface 42 as previously described. In some examples, the second portion 20 may include a sensor 95 in addition to or in lieu of the sensor 94 that is to detect a magnetic field associated with the magnet 92 coupled to the third portion 40. Thus, during operations, when the third portion 40 is placed in the second position of FIGS. 2 and 13, the sensor 95 may detect the magnetic field associated with magnet 92 and based on that output from the sensor 95, the processor 82 (see e.g., FIG. 12) may determine that the third portion 40 is in the second position and therefore activate the first touch sensitive surface 42 and deactivate the user input device 22 and/or the second touch sensitive surface 44 as previously described.

Referring again to FIG. 12, in some examples, a power source 86 may be positioned within the third portion 40. The power source 86 may provide electrical power to some or all of the other components within the housing 11 of electronic device 10. For instance, the power source 86 may provide electrical power to the processor 82, display panel 14, etc. Power source 86 may comprise any suitable device or assembly for storing and/or delivering electric current, such as, for instance, a capacitor, battery (e.g., rechargeable battery), etc. In some examples, the power source 86 may be positioned within the second portion 20 and/or the first portion 12 of housing 11.

The examples disclosed herein include electronic devices (e.g., electronic device 10) comprising a user input device (e.g., user input device 22) and a touch sensitive surface (e.g., touch sensitive surfaces, 42, 44, etc.) pivotably coupled to the user input device. During operations, both the user input device and the touch sensitive surface may be selectively used to provide inputs to the electronic device. Thus, through use of the example electronic devices disclosed herein, a user may selectively provide inputs on a user inputs device and/or a touch sensitive surface that are supported within a mobile and compact housing (e.g., housing 11).

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the preceding discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, including in the claims, the word "or" is used in an inclusive manner. For example, "A or B" means any of the following: "A" alone, "B" alone, or both "A" and "B."

What is claimed is:

1. An electronic device, comprising:
   a first portion including a display panel;
   a second portion pivotably coupled to the first portion at a first hinge, wherein the second portion includes a user input device; and
   a third portion pivotably coupled to the second portion at a second hinge that is substantially parallel with the first hinge, the second hinge comprising an axis of rotation, wherein the third portion has a first side and a second side opposite the first side, wherein the first side comprises a first touch sensitive surface, and wherein the second side comprises a second touch sensitive surface;
   wherein:
      the third portion includes a rear edge and a front edge opposite the rear edge;
      the second hinge is coupled to the second side and is spaced between the rear edge and the front edge; and
      the axis of rotation of the second hinge is above the entire second side of the third portion.

2. The electronic device of claim 1, wherein the third portion is larger than the second portion.

3. The electronic device of claim 2, wherein the third portion is to pivot relative the second hinge to cover the user input device with the first touch sensitive surface.

4. The electronic device of claim 3, wherein the first touch sensitive surface is larger than the second touch sensitive surface.

5. The electronic device of claim 1, wherein the first hinge has a first axis of rotation and the second hinge has a second axis of rotation, wherein the first axis of rotation is parallel to the second axis of rotation.

6. The electronic device of claim 1, wherein the second hinge comprises a single axis of rotation.

7. An electronic device, comprising:
   a housing comprising a plurality of portions that are pivotably coupled together,
   wherein the plurality of portions including a first portion including a display panel, a second portion including a user input device, and a third portion including a touch sensitive surface;

wherein the second portion is pivotably coupled between the first portion and the third portion;

wherein the second portion is pivotable relative to the first portion about a first axis of rotation;

wherein the third portion includes a rear edge and a front edge opposite the rear edge;

wherein the third portion is pivotable relative to the second portion about a second axis of rotation between the rear edge and the front edge to cover the user input device with the touch sensitive surface; and wherein the second axis of rotation is substantially parallel with the first axis of rotation and positioned above the entire third portion.

8. The electronic device of claim 7, wherein the third portion is to pivot relative to the second portion to position the input device over the touch sensitive surface.

9. The electronic device of claim 8, wherein the third portion is larger than the second portion.

10. The electronic device of claim 8, wherein the touch sensitive surface is to face away from the input device both when the touch sensitive surface covers the input device and when the input device is positioned over the touch sensitive surface.

11. The electronic device of claim 8, wherein the third portion includes a second touch sensitive surface on a side that is opposite the touch sensitive surface.

12. The electronic device of claim 11, wherein the touch sensitive surface is larger than the second touch sensitive surface.

13. An electronic device, comprising:
a user input device;
a display panel pivotably coupled to the user input device about a first hinge;
a touch sensitive surface pivotably coupled to the user input device about a second hinge substantially parallel with the first hinge; and
a processor communicatively coupled to the user input device and the touch sensitive surface, wherein the processor is to activate one of the user input device or the touch sensitive surface and deactivate the other of the user input device or the touch sensitive surface based on a rotational position of the touch sensitive surface relative to the user input device such that only one of the user input device or the touch sensitive surface are activated at a time;
wherein:
the second hinge is positioned between a rear edge and a front edge of the touch sensitive surface and above the entire touch sensitive surface; and
the rear edge and the front edge are substantially parallel with the second hinge.

14. The electronic device of claim 13, wherein the touch sensitive surface is to rotate about the user input device to a first position wherein the touch sensitive surface covers the user input device, and wherein the processor is to activate the touch sensitive surface and deactivate the user input device when the touch sensitive surface is in the first position.

15. The electronic device of claim 13, wherein the touch sensitive surface is to rotate about the user input device to a second position wherein the user input device is positioned over the touch sensitive surface, and wherein the processor is to activate the user input device and deactivate the touch sensitive surface when the touch sensitive surface is in the second position.

* * * * *